Feb. 23, 1926.

D. H. FRANKE ET AL 1,573,925

SOLDERING IRON

Filed July 11, 1924

David H. Franke and
Nicholas G. De Vries
Inventors

BY Victor J. Evans
ATTORNEY

WITNESS: O. Thalmann

Patented Feb. 23, 1926.

1,573,925

UNITED STATES PATENT OFFICE.

DAVID H. FRANKE AND NICKOLAS G. DE VRIES, OF BROOKLYN, NEW YORK.

SOLDERING IRON.

Application filed July 11, 1924. Serial No. 725,517.

*To all whom it may concern:*

Be it known that we, DAVID H. FRANKE and NICKOLAS G. DE VRIES, citizens of the United States, residing at Brooklyn, in the county of Kings and State of New York, have invented new and useful Improvements in Soldering Irons, of which the following is a specification.

The object of this invention is the provision of an electrically heated soldering iron, in which a removable carbon element is employed as the soldering point, and in which the iron proper has a conductor provided with a clip for attachment to one pole of a storage battery, a conductor having a clip at both ends, one of which for engagement with the second pole of the battery being employed, the clip on the end of the last mentioned conductor engaging the article to be soldered so that the circuit is completed only when the soldering point is brought against the article operated upon.

A further object is the production of a soldering iron of this character which is characteristic of simplicity and cheapness in construction, durability and efficiency in use, and wherein the carbon soldering point may be removed and cheaply replaced when worn or injured.

To the attainment of the foregoing, the improvement resides in the construction, combination and operative association of parts such as is disclosed by the drawings which accompany and which form part of this application.

In the drawings:—

Figure 1:
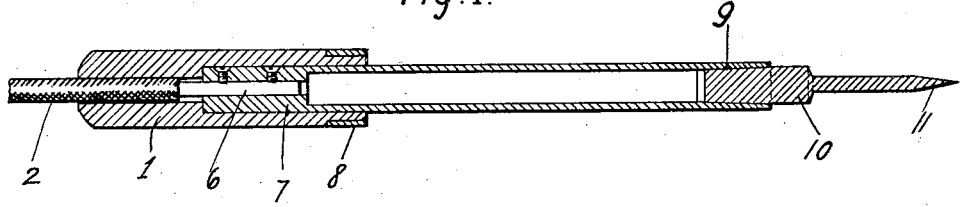
Figure 1 is a longitudinal sectional view through the soldering iron proper.
Figure 2:
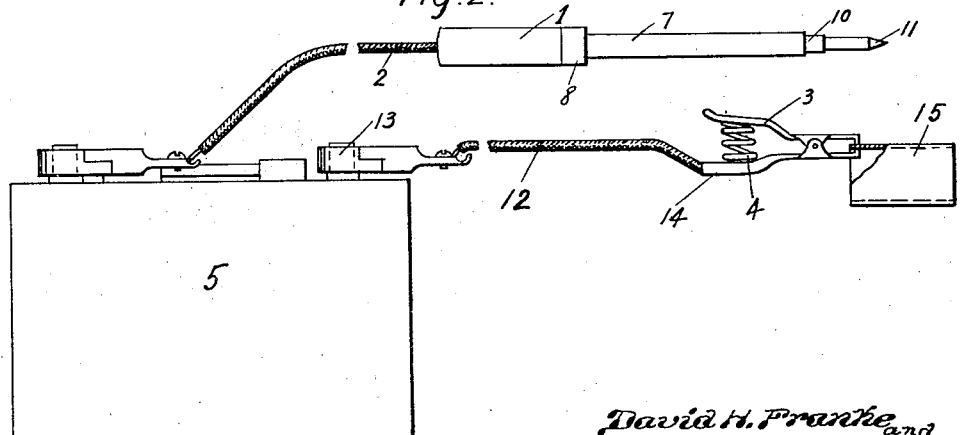
Figure 2 is an elevation showing the manner in which the soldering iron is used.

The improvement includes a handle 1 of insulating material. Entering the handle through the rear end thereof there is a conductor 2. The conductor has secured on its outer end a metal clip 3, the same comprising a pair of hingedly connected jaw members normally forced into engagement by a spring 4. The jaws of the clip are designed to engage one pole of a battery 5.

The conductor 2 has a covering of insulating material, and the same at the portion thereof received in the handle being removed, so that the conductor may enter the reduced bore 6 at the inner end of a copper sleeve 7 that is let in the handle 1. A ferrule 8 arranged around the outer end of the handle holds the sleeve 7 properly positioned. The bore proper of the sleeve 8 is enlarged, so that the major portion of the copper sleeve is comparatively thin. The bore of the sleeve, at the outer end thereof, is flared inwardly, as at 9, for frictional engagement with the flared body portion 10 of a carbon soldering point. The point proper, indicated by the numeral 11, is of a materially less cross sectional diameter than the body 10.

The second conductor, indicated by the numeral 12, has an insulating cover and is provided at both of its ends with spring clips 13 and 14 respectively, the clip 13 being similar to the clip 3 and designed to engage with the second pole of a battery 5. The smaller clip 13 is adapted to engage an article 15 to be soldered.

From the foregoing description, when taken in connection with the drawings it will be seen that we have produced a soldering iron which is heated only when it is being used and in which the generated heat is transmitted efficiently to the working surface. The electric energy is thus economically used, and the construction is of such simplicity that the same may be cheaply manufactured and marketed. As previously stated, the carbon soldering point may be cheaply replaced when used or injured.

Having described the invention, we claim:—

An electrically heated soldering iron comprising a handle of insulating material, a copper sleeve let in the handle and projecting therefrom, said sleeve having its bore flared inwardly at the outer portion thereof, a carbon soldering point having an enlarged body which is flared to be received in and frictionally engage with the flared wall of the copper sleeve, and an insulated conductor passing through the rear end of the handle and removably secured in the sleeve.

In testimony whereof we affix our signatures.

DAVID H. FRANKE.
NICKOLAS G. DE VRIES.